(12) United States Patent
Meo et al.

(10) Patent No.: US 11,737,178 B2
(45) Date of Patent: Aug. 22, 2023

(54) APPARATUS AND METHOD OF ANALYZING THE ABSORPTION BEHAVIOR OF AN OBJECT

(71) Applicant: Topinox Sarl, Wittenheim (FR)

(72) Inventors: Fernando Meo, Wittenheim (FR); Heinrich Fehn, Wittenheim (FR)

(73) Assignee: TOPINOX SARL, Wittenheim (FR)

( * ) Notice: Subject to any disclaimer, the term of this patent is extended or adjusted under 35 U.S.C. 154(b) by 470 days.

(21) Appl. No.: 17/029,540

(22) Filed: Sep. 23, 2020

(65) Prior Publication Data

US 2021/0092806 A1    Mar. 25, 2021

(30) Foreign Application Priority Data

Sep. 23, 2019  (DE) .......................... 102019125551.1

(51) Int. Cl.
*H05B 6/64* (2006.01)
*H05B 6/70* (2006.01)
*G01N 22/00* (2006.01)

(52) U.S. Cl.
CPC ........... *H05B 6/6447* (2013.01); *G01N 22/00* (2013.01)

(58) Field of Classification Search
CPC ........ B63B 21/663; B66D 1/36; G01N 22/00; G06F 16/24573; G06F 16/337; G06F 16/9014; G06F 16/9535; G06F 21/32; G06F 3/0484; G06F 9/4418; G06Q 20/32; G06Q 20/326; G06Q 20/3263; G06Q 20/3274; H04M 1/67; H04M 1/72439; H05B 6/6447; H05B 6/705; Y02B 40/00

USPC ....... 219/709, 702, 704, 711, 725, 728, 761, 219/750, 748, 745
See application file for complete search history.

(56) References Cited

U.S. PATENT DOCUMENTS

| 5,113,190 | A   |   | 5/1992  | Klein |          |
|-----------|-----|---|---------|-------|----------|
| 9,377,367 | B2  | * | 6/2016  | Podhajsky | ............. A61B 34/10 |
| 2021/0400778 | A1 | * | 12/2021 | Meo  | ........................ G01N 22/00 |

FOREIGN PATENT DOCUMENTS

| DE | 2612749 A1    | 9/1976  |
| DE | 3915280 A1    | 11/1990 |
| DE | 102012006578 A1 | 10/2013 |

(Continued)

*Primary Examiner* — Quang T Van
(74) *Attorney, Agent, or Firm* — Hayes Soloway PC

(57) ABSTRACT

Analyzing the absorption behavior of an object includes: generating at least one electromagnetic signal such that a fixed spatial electric field distribution is produced; modulating the electromagnetic signal with a waveform to generate a modulated signal which is emitted as a forward electromagnetic wave towards the object to be analyzed; measuring at least one wave quantity of the forward electromagnetic wave; receiving a backward electromagnetic wave; measuring at least one wave quantity of the backward electromagnetic wave; and evaluating the measured wave quantity of the backward electromagnetic wave and the measured wave quantity of the forward electromagnetic wave by respectively transforming the measured wave quantities to obtain a spectrum of the respective transformation, wherein the spectrum assigned to the forward electromagnetic wave is compared with the spectrum assigned to the backward electromagnetic wave to determine deviations of the spectra from each other based on which the object is characterized.

11 Claims, 6 Drawing Sheets

(56) References Cited

FOREIGN PATENT DOCUMENTS

| | | |
|---|---|---|
| DE | 102014111019 A1 | 1/2016 |
| DE | 102015103246 A1 | 9/2016 |
| DE | 102015109070 A1 | 12/2016 |
| WO | 2018024735 A1 | 2/2018 |

* cited by examiner

APPARATUS AND METHOD OF ANALYZING THE ABSORPTION BEHAVIOR OF AN OBJECT

CROSS-REFERENCE TO RELATED APPLICATIONS AND PRIORITY

This patent application claims priority from German Application No. DE 102019125551.1 filed Sep. 23, 2019. This patent application is herein incorporated by reference in its entirety.

FIELD OF THE DISCLOSURE

The present disclosure relates to a method of analyzing the absorption behavior of an object. Furthermore, the present disclosure relates to a method of operating a cooking device and to an analyzing device, in particular a cooking device for cooking food to be cooked.

BACKGROUND

In professional or large kitchens, cooking devices are used which usually cook food to be cooked by means of hot air and/or steam, a cooking atmosphere being generated via the hot air and steam in a cooking chamber of the cooking device in which the food to be cooked is placed. In addition to the above-mentioned components for cooking the food to be cooked, such cooking devices may also be equipped with a microwave source, such as a magnetron or a solid state microwave generator ("Solid State Cooking"—SSC), via which electromagnetic radiation that is fed into the cooking chamber to thus also cook the food to be cooked is generated.

When cooking the food to be cooked using electromagnetic radiation, care must be taken to ensure that no so-called hotspots are created, which in particular occur near metal objects such as slide-in rails, core temperature sensors or other metal objects in the cooking chamber. The hotspots may also occur if the food to be cooked has a different aspect ratio (volume to surface size), as can be the case with chicken breasts, for example, which have a thicker and a thinner area. Hotspots may also occur in case of a so-called mixed loading of the cooking chamber, i.e. different foods to be cooked, or in case of a dish containing several different foods to be cooked, resulting in inhomogeneous dielectric properties in the cooking chamber.

The hotspots may then cause the thinner area to dry out when cooking the food to be cooked using electromagnetic radiation, which is undesirable. In principle, these effects also occur with food to be cooked which have corners or edges, as these cause a focusing effect of the electromagnetic radiation.

In particular during cooking processes such as defrosting processes, so-called thermal outliers may occur, as the absorption behavior of the food to be cooked with regard to electromagnetic radiation changes abruptly/strongly when the food to be cooked is no longer in the frozen state. This is due to the fact that the absorption behavior of a frozen food to be cooked is negligible compared to a defrosted food to be cooked, but changes strongly, in particular exponentially, in the 0° C. range. In this respect, even a small change in the microwave power, in particular the absorbed microwave power, may lead to a strong temperature increase in the food to be cooked, which in turn leads to a greater absorption behavior of the food to be cooked. Thus, a chain reaction leading to a hotspot may occur.

To avoid the hotspots when cooking using electromagnetic radiation, it has been known up to now to position the food to be cooked on a turntable in cooking devices intended for household use, for example. The food to be cooked is thus moved in the electric field generated by the microwaves (electromagnetic radiation). In cooking devices used in the field of professional or large kitchens, it is known that a fan impeller which is present anyway acts as a so-called mode mixer to swirl the generated electromagnetic field in the cooking chamber to accordingly reduce or avoid hotspots.

However, it has been shown that the known measures are only suitable to a limited extent, in particular for defrosting processes, due to the high sensitivity with regard to the absorption behavior, i.e. the changing dielectric properties of the food to be cooked.

This problem does not only apply to the defrosting of food to be cooked in cooking devices, but also in systems in which objects having different or changing dielectric properties are processed, for example in an ice cream production system in which the state of the corresponding object, i.e. the ice cream, is to be analyzed or monitored.

The analysis or evaluation of objects having different dielectric properties may also be used by transport service providers or at security checks, for example at airports, to detect specific objects or the states thereof.

SUMMARY

The object of the present disclosure is to offer a possibility of effectively and efficiently detecting an object or the state thereof by means of electromagnetic radiation.

According to the present disclosure, the object is achieved by a method of analyzing the absorption behavior of an object, comprising the following steps:

generating at least one electromagnetic signal emitted via at least one antenna such that a fixed spatial electric field distribution is produced, modulating the electromagnetic signal with a waveform at the fixed spatial electric field distribution to generate a modulated signal which is emitted via the at least one antenna as a forward electromagnetic wave towards the object to be analyzed, measuring at least one wave quantity of the forward electromagnetic wave, receiving a backward electromagnetic wave via at least one antenna, measuring at least one wave quantity of the backward electromagnetic wave, and evaluating the measured wave quantity of the backward electromagnetic wave and the measured wave quantity of the forward electromagnetic wave by respectively transforming the measured wave quantities to obtain a spectrum of the respective transformation, wherein the spectrum assigned to the forward electromagnetic wave is compared with the spectrum assigned to the backward electromagnetic wave to determine deviations of the spectra from each other on the basis of which the object is characterized.

Furthermore, the object is achieved according to the present disclosure by an analyzing device for analyzing the absorption behavior of an object, having at least one microwave generator, which is arranged to generate an electromagnetic signal. The cooking device comprises at least one antenna, which is assigned to the microwave generator. In addition, the cooking device has a modulation unit which is arranged to modulate the electromagnetic signal generated by the microwave generator with a waveform to generate a modulated signal. Furthermore, the cooking device comprises a measuring unit assigned to the at least one antenna, wherein the measuring unit is arranged to measure at least one wave quantity of a forward wave of the signal as well as at least one wave quantity of a backward wave. The cooking device has a control and/or evaluation unit which is arranged to evaluate the measured wave quantity of the backward electromagnetic wave and the measured wave quantity of the forward electromagnetic wave by respectively performing a transformation of the measured wave quantities to obtain a spectrum of the respective transformation, wherein the control and/or evaluation unit is arranged to compare the spectrum assigned to the forward electromagnetic wave with the spectrum assigned to the backward electromagnetic wave to determine deviations of the spectra from each another on the basis of which the object is characterized.

The basic idea is to determine the absorption behavior of the object to be analyzed on the basis of the evaluation of the wave quantity of the forward as well as the backward electromagnetic wave, wherein, among other things, the object itself and/or a state of the object may be determined.

Furthermore, when used in a cooking device, it is thus possible to determine corresponding excitation parameters for the microwave generator or the electromagnetic signal, where a spatial electrical field distribution in a cooking chamber of the cooking device is generated, where the risk of hotspots forming is low. This can be determined in a simple way by taking the change in the waveform into account, as even small changes in the absorption behavior of food to be cooked in the cooking chamber, i.e. the corresponding absorption of radiation, result in changes in the waveform, in particular the waveform of the backward electromagnetic waves.

Basically, these changes may be determined in a simple way when evaluating the measured wave quantities, as corresponding wave quantities for both the forward wave and the backward wave are measured and evaluated, from which the respective waveform and thus corresponding changes can be concluded.

For this purpose, each measured wave quantity is transformed, i.e. subjected to a mathematical transformation, so that even small deviations may be detected. For this reason, the electromagnetic signal is also modulated at the fixed spatial electrical field distribution.

For example, the mathematical transformation of the measured wave quantities is a Fourier transformation, a wavelet transformation, a Z-transformation and/or a Laplace transformation. Basically, a time-frequency analysis may be performed in the mathematical transformation.

During the evaluation, the measured wave quantity can be used directly or indirectly, i.e. the power, for example, which corresponds to the square of the measured amplitude.

To this end, the electromagnetic signal, which is to be emitted towards the object to be analyzed, is first modulated with a waveform at a fixed spatial electric field distribution to obtain a correspondingly modulated signal, which is to be emitted towards the object to be analyzed, for example which it is to be fed into the cooking chamber. The changes in the waveform can thus be detected in a particularly easy and quick manner.

For example, the modulation may be carried out with a symmetrical waveform, so that the analysis is particularly simple, as corresponding deviations can be detected particularly easily with such a modulation. In other words, the asymmetry of the backward electromagnetic wave is influenced by the absorption properties of the object, of the contents of the cooking chamber for example, i.e. of the food to be cooked, among others.

It is in principle possible to infer the risk of hotspots occurring during a cooking process or in the cooking device, provided that the absorption behavior has changed, which can be sensed accordingly by a change in the waveform, which in turn is determined by the at least one wave quantity.

In a similar way, the defrosting of ice cream in an ice cream production plant can be detected in time.

In particular, the same wave quantity is measured for the forward wave and the backward wave.

Basically, the measuring unit may have a fast working processor, so that the processor can directly process the measured wave quantity of the forward electromagnetic wave and the measured wave quantity of the backward electromagnetic wave. This is important as both the waveform quantity of the forward electromagnetic wave and the waveform quantity of the backward electromagnetic wave are measured at the same fixed spatial electric field distribution at which the electromagnetic signal has been modulated.

At least one directional coupler can be used to measure the at least one wave quantity, which is thus part of the measuring unit. In particular, the directional coupler is assigned to the antenna, for example between the antenna and the microwave generator, so that both the forward and the backward electromagnetic waves are decoupled via the directional coupler.

The spatial electric field distribution is unknown but unique. Only the waveform of the signal measured at the antenna is of importance for the evaluation, but not the concrete spatial electric field distribution which results in the respective signal.

The amplitude strength is not important for the evaluation, either. In other words, the evaluation step of the method is independent of the amplitude strength.

Via the evaluation of the wave quantity (quantities), it is possible to determine excitation parameters which are to be used, for example, for the process of cooking food to be cooked. These include the frequency, amplitude and/or phase of the electromagnetic signal which is generated. The corresponding excitation parameters form an excitation vector.

In addition to the excitation parameters, the position of an (optionally available) mode mixer, e.g. a fan impeller, can be taken into account, as this also has an influence on the fixed spatial electrical field distribution. In other words, the excitation parameters are determined at a specific position of the mode mixer or fan impeller, if available.

The excitation parameters of the microwave generator together with the position of the mode mixer or fan impeller constitute so-called control parameters.

The microwave generator used to generate the electromagnetic radiation or the electromagnetic signal is in particular a solid state microwave generator. In this respect, the excitation parameters of the microwave generator can be adjusted individually and independently of each other.

The spatial electric field distribution can basically be adjusted accordingly, even if it is unknown, via the control parameters, i.e. the excitation parameters and the position of the mode mixer/fan impeller. In this respect, a different spatial electric field distribution may be achieved due to a different excitation vector and/or position of the mode mixer or fan impeller, i.e. due to different control parameters.

The measured wave quantity of the forward electromagnetic wave or of the backward electromagnetic wave may be the phase and/or the amplitude. This can be used to draw conclusions about the waveform accordingly, in particular the change in the waveform, which in turn allows conclusions about the absorption behavior of the objects, for example in the cooking chamber of the cooking device.

The modulation of the generated electromagnetic signal can be an amplitude modulation and/or a phase modulation. In this respect, the electromagnetic signal can be modulated with regard to its amplitude and/or phase. The waveform used therefor may be a symmetrical waveform, such as a sine, cosine, square, sawtooth, triangle and/or trapezoid form. In this respect, the modulation may also be a combination of the aforementioned forms.

Basically, several antennas may be provided, via which forward electromagnetic waves are emitted or the backward electromagnetic waves are received.

In the fixed spatial electric field distribution, each antenna is in particular supplied with a correspondingly assigned electromagnetic signal, which is modulated before being fed in.

The several electromagnetic signals are in particular coherent to each other. A single microwave generator may be provided, which generates an electromagnetic signal which is fed to the several antennas.

Several microwave generators may also be provided, which are operated coherently to each other. In particular, each antenna is assigned to a respective microwave generator, so that there is a unique assignment. The excitation parameters for the electromagnetic signals (for each antenna) can be set individually.

A directional coupler is in particular assigned to each antenna, so that for each antenna, the forward electromagnetic waves and the backward electromagnetic waves can be decoupled via the directional coupler to measure the corresponding wave quantity.

Therefore, the at least one wave quantity of the forward electromagnetic wave and the at least one wave quantity of the backward electromagnetic wave can be measured (at each antenna) for each fixed spatial electric field distribution.

The electromagnetic waves are in particular microwaves.

In principle, the method may also be used in a cooking device if the food to be cooked is cooked using conventional techniques, for example by hot air, steam and/or heat radiation.

One aspect provides that at least one network parameter is determined via the measured wave quantities, which is assigned to the at least one antenna. The corresponding network parameter can result from the ratio of the wave quantity of the forward electromagnetic wave and the wave quantity of the backward electromagnetic wave. The network parameter may also be a difference of the measured wave quantities. In case of several antennas, a corresponding network parameter is determined for each antenna.

Therefore, the corresponding network parameter can be determined (at each antenna) for each fixed spatial electric field distribution.

In principle, the measured wave quantities and/or the control parameters may be subjected to mathematical operations during the evaluation. For example, (first or higher) derivatives of the detected wave quantities and/or the control parameters, integrations over the detected wave quantities and/or control parameters or other mathematical operations like addition, subtraction, multiplication or division of the detected wave quantities and/or the control parameters are performed.

A separation or a combination (grouping) of the acquired data may also be carried out.

A further aspect provides that the transformation of the corresponding wave quantity includes phase information and/or amplitude information. The phase and/or the amplitude may thus be evaluated accordingly, as a comparison of the corresponding information is carried out to detect deviations regarding the phase and/or the amplitude.

In addition, the corresponding measured wave quantities can first be filtered during the evaluation.

In particular, the measured wave quantity of the backward electromagnetic wave and the measured wave quantity of the forward electromagnetic wave at at least one specific frequency are measured and/or evaluated. If the entire spectrum is measured, the evaluation of the respectively obtained wave quantities may be carried out at a specific frequency at which a deviation or asymmetry is to be expected due to the absorption behavior.

In principle, the specific frequency corresponds to the modulation frequency.

The at least one specific frequency is in particular an asymmetric harmonic Fourier frequency (AHFF). The asymmetric harmonic Fourier frequency (AHFF) is characterized by the fact that the asymmetry caused by the absorption behavior occurs at the corresponding frequencies, in particular in the Fourier spectrum. The modulation was done with a symmetrical waveform.

In general, the wave quantities may be evaluated by the evaluation in the frequency domain.

Basically, curves of the wave quantity (quantities) at the specific frequencies, in particular the asymmetric harmonic Fourier frequencies, can be created, if several specific frequencies are present in the recorded spectrum.

The specific frequency, in particular the asymmetric harmonic Fourier frequency (AHFF), results from the duty cycle and the cycle frequency. Finally, the specific frequencies, in particular the asymmetric harmonic Fourier frequencies, correspond to a multiple of the quotient of the cycle frequency and the duty cycle.

At the specific frequencies, in particular the AHFF, even small changes of the corresponding wave quantity (quantities) can be detected, even if these changes are short term and/or transient changes.

In particular, the absolute values of the corresponding wave quantity (quantities) are insignificant, rather, only the relative change of the respective wave quantity (quantities) is relevant. In other words, among other things, the amplitude strength is not important for the evaluation.

It can thus be focused on the change of at least one wave quantity of the backward electromagnetic wave relative to the forward electromagnetic wave.

In this respect, the change taken into account in the evaluation depends only on the absorption behavior, i.e. on the object itself, for example the contents of the cooking chamber, and the area covered by the fixed spatial electric field distribution.

A further aspect provides that several different modulated signals are generated, which are used at several different fixed spatial electric field distributions, wherein the wave quantity of the forward electromagnetic wave and the wave quantity of the backward electromagnetic wave are measured and evaluated for each fixed spatial electric field distribution. In other words, different fixed spatial electric field distributions are successively generated, at which the corresponding electromagnetic signal is then modulated. The different modulated signals can be generated by different modulations and/or different excitations, i.e. basically at different control parameters. In this respect, the wave quantities can be measured at several different fixed spatial electric field distributions, which in turn can provide information about different areas in the cooking chamber, as the fixed spatial electric field distributions cover different areas. It is thus detected how the absorption is in the corresponding areas.

It is thus possible to easily determine fixed spatial electric field distributions and the associated control parameters which result in a high or low absorption. This can be determined in a simple way by comparison.

In other words, the control parameters can be divided into suitable control parameters and unsuitable control parameters depending on the respective purpose of application.

The measured wave quantity of the backward electromagnetic wave and the measured wave quantity of the forward electromagnetic wave can thus at least be evaluated for all fixed spatial electric field distributions at specific frequencies. For the different spatial electric field distributions, the respective absorption behavior is determined accordingly in a simple way. As already explained, the specific frequencies can be the asymmetric harmonic Fourier frequencies (AHFF), where an asymmetry of the waveform can be determined in a simple way.

It may happen that the forward electromagnetic wave modulated with a symmetric waveform still has a slight asymmetry. However, this slight asymmetry is many times smaller than the asymmetry of the backward wave which is to be taken into account, which is why it is negligible. In this respect, the control parameters can nevertheless be divided into suitable control parameters and unsuitable control parameters depending on the respective purpose of application.

A further aspect provides that, based on the evaluation, control parameters are used to cook the food to be cooked, which generate fixed spatial electric field distributions in the cooking chamber, where the absorption is essentially the same. It is thus possible to avoid the generation of hotspots, which occur, for example, due to a suddenly increased absorption behavior. Thus, several fixed spatial electric field distributions are tested or evaluated, wherein the respective absorption behavior in the cooking chamber is determined, as the change of the waveform (via the corresponding wave quantity) is detected. For cooking the food to be cooked, only those control parameters are used which result in fixed spatial electric field distributions for which the absorption behavior is (essentially) the same.

Based on a statistical analysis of a distribution of specific frequencies at different measurements, i.e. at different fixed spatial electric field distributions, it can be determined whether a uniform power output is achieved, for example whether a food to be cooked is cooked evenly. As already explained, the specific frequency is the modulation frequency.

The statistical analysis can also be used to determine whether a specific object is present.

In other words, so-called features can be extracted from the distribution of the specific frequencies, in particular the AHFF, which are used for the analysis.

In principle, at least one evaluation quantity can be determined during the evaluation, which is used as an input parameter for a mathematical model, a machine learning algorithm or a regression model. The evaluation quantity may be a feature that has been extracted from the distribution of specific frequencies, in particular the AHFF.

A further aspect provides that, based on the evaluation, the radiant power is adjusted for at least one fixed spatial electric field distribution. The radiant power is the power of the electromagnetic radiation. Thus, the power of electromagnetic radiation can also be adjusted for a corresponding fixed spatial electric field distribution, for example if it is found that there is a relatively high absorption at the electric field distribution, which is however not desired.

Furthermore, the method, in particular the evaluation of the wave quantities, can be used to determine an object type of the object, a position of the object, the volume of the object, the amount of the object, the temperature of the object, the aspect ratio of the object, the number of objects and/or the state of the object. It is therefore also possible to recognize which kind of food to be cooked (type of food to be cooked) is in the cooking chamber. In addition, it is also possible to determine the state of the food to be cooked on the basis of the detected wave quantities and the evaluation thereof. The absorption behavior of the food to be cooked changes with the cooking condition, which can be detected thereby. Different foods to be cooked also have different absorption properties, which can also be detected.

As the method can basically also be used in fields of application other than a cooking device, any type of object can thus be characterized accordingly.

The electromagnetic signal can be introduced into the cooking chamber during a heating phase or an idle phase, e.g. during a phase in which food to be cooked is cooked using electromagnetic radiation, or during a phase in which no energy is introduced into the food to be cooked or at least not by electromagnetic radiation, e.g. in an exclusively hot-air mode.

In principle, the method can be carried out at an electromagnetic radiation power which is below the usual heating power used to cook food to be cooked by electromagnetic radiation, namely in the milliwatt range. For example, the power of the electromagnetic signal is 200 W, whereas the heating power during the heating phase is 800 W. This reduced power is also referred to as sensor power.

Alternatively, it may be provided that the method is performed with electromagnetic radiation that has a power corresponding to the heating power.

The same antennas can be used for the emission of the electromagnetic radiation with heating power or sensor power. Alternatively, correspondingly assigned antennas may be provided via which only electromagnetic radiation with heating power or electromagnetic radiation with sensor power is introduced.

Basically, the method permits a uniform heating or defrosting of food to be cooked by means of electromagnetic radiation, in particular microwaves.

The electromagnetic waves can be represented as follows:

$$a_i(f) = A_i e^{-j\varphi i},$$

where i is the respective antenna, $A_i$ the respective amplitude and $\varphi_i$ a corresponding phase information.

The analyzing device, for example the cooking device, is in particular set up to perform the method described above.

Basically, the present disclosure also comprises a method of operating a cooking device, in which first a method of the aforementioned type is carried out so that the absorption behavior of the at least one object located in the cooking chamber is determined. Subsequently, the power of the electromagnetic radiation based on the determined absorption behavior is focused into at least one specific area of the cooking chamber or evenly distributed in the cooking chamber.

The power distribution can thus be adjusted, as the power is focused or evenly distributed in the cooking chamber, which results in correspondingly different power distributions.

In principle, control parameters are used which result in a corresponding power distribution of the electromagnetic radiation.

It is therefore possible to first determine the absorption behavior in the cooking chamber, in particular of the food to be cooked placed in the cooking chamber. Based thereon, the at least one microwave generator can be controlled such that the outgoing electromagnetic signals or waves form a fixed spatial electric field distribution in the cooking chamber, which results in a focusing of the electromagnetic radiation or an improved uniform distribution of the electromagnetic radiation, in particular of the power of the electromagnetic radiation. In this respect, specific areas in the cooking chamber can be purposefully exposed to a higher power level to cook a food to be cooked placed there more quickly or more strongly.

For example, food to be cooked that has been added later can be cooked more quickly, so that it is finished at the same time as the food to be cooked already present in the cooking chamber. This also allows different cooking states to be achieved.

BRIEF DESCRIPTION OF THE DRAWINGS

Further advantages and features will become apparent from the description below and from the drawings to which reference is made and in which.

DETAILED DESCRIPTION

Figure 1:
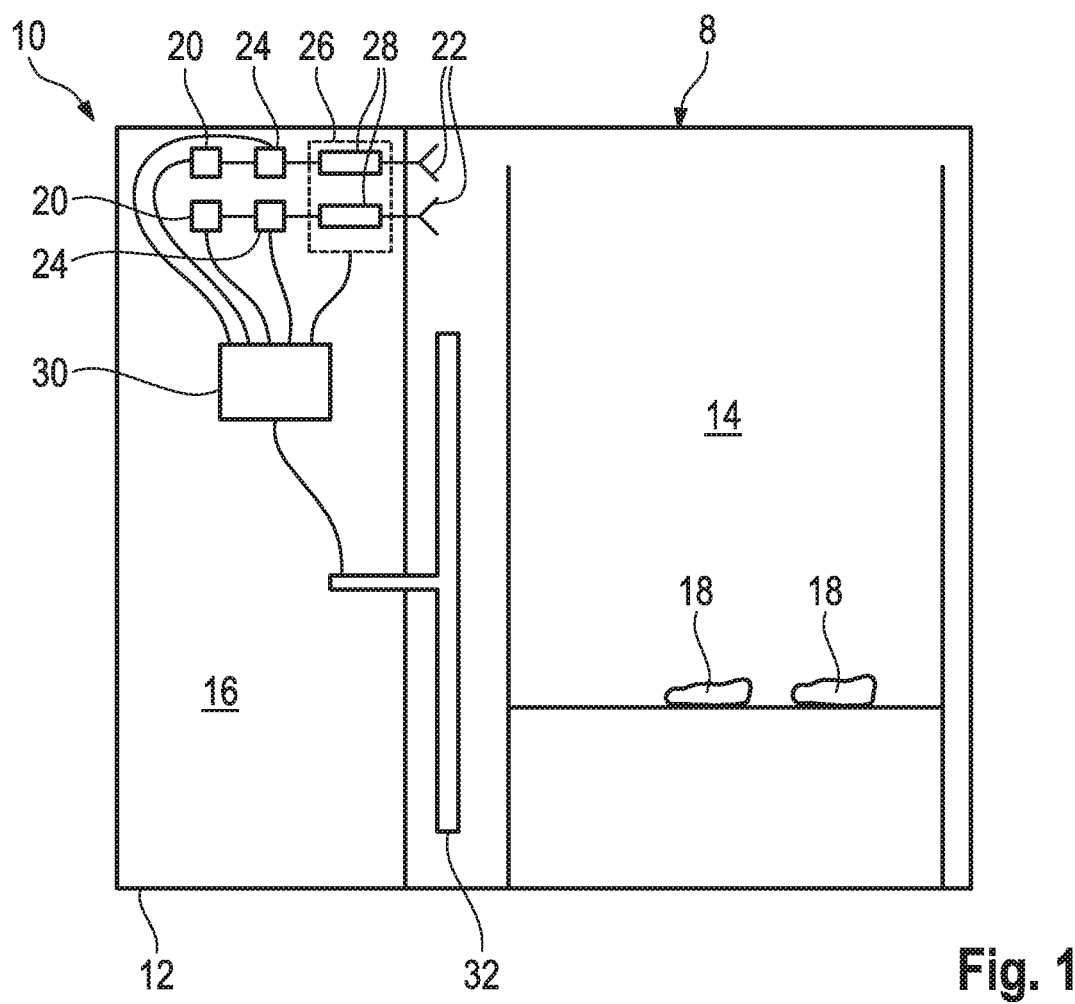
FIG. 1 shows a schematic representation of an analyzing device in the form of a cooking device according to the present disclosure.

FIG. 1 shows an analyzing device 8 in the form of a cooking device 10 having a housing 12 surrounding a cooking chamber 14 and a technical chamber 16.

An object 18 in the form of a food to be cooked which is to be cooked by electromagnetic radiation, among others, is placed in the cooking chamber 14.

For this purpose, the cooking device 10 in the embodiment shown comprises several microwave generators 20, each of which is arranged to generate an electromagnetic signal.

The electromagnetic signals generated by the microwave generators 20 are each transmitted to an associated antenna 22 to be fed into the cooking chamber 14.

The microwave generators 20 are coherently operated microwave generators, so that the electromagnetic signals are coherent signals.

In the respective lines between each microwave generator 20 and the assigned antenna 22, a modulation unit 24 may be provided, which can alternatively also be integrated in the corresponding microwave generator 20.

The modulation unit 24 is arranged to modulate the electromagnetic signal generated by the microwave generator 20 with a waveform so that a modulated signal is generated which is transmitted to the corresponding antenna 22, through which the modulated signal is fed into the cooking chamber 14.

In addition, the cooking device 10 comprises a measuring unit 26, which in the embodiment shown has several directional couplers 28, of which at least one directional coupler 28 is provided in the line between a microwave generator 20 and the associated antenna 22.

Via the directional couplers 28, both a forward electromagnetic wave and a backward electromagnetic wave can be decoupled from the corresponding line. In this respect, the measuring unit 26 can measure at least one wave quantity of the forward electromagnetic wave of the modulated signal as well as at least one wave quantity of the backward electromagnetic wave, in particular for each of the antennas 22 via the corresponding directional couplers 28.

The measuring unit 26 can be part of a control and/or evaluation unit 30 which includes the cooking device 10.

Alternatively, the measuring unit 26 can be coupled to the control and/or evaluation unit 30, which is then designed separately, so that the wave quantities measured by the measuring unit 26 are transmitted to the control and/or evaluation unit 30.

The control and/or evaluation unit 30 is arranged to evaluate the measured wave quantity of the backward electromagnetic wave and the measured wave quantity of the forward electromagnetic wave to identify a deviation from the symmetrical waveform, which in turn allows conclusions to be drawn about the absorption behavior in the cooking chamber 14.

For this purpose, the measuring unit 26 or the control and/or evaluation unit 30 may have a fast operating processor which processes the measured wave quantity of the forward electromagnetic wave as well as the measured wave quantity of the backward electromagnetic wave in real time.

For example, the processor has a data acquisition rate of 50 kHz, which is many times higher than the cycle frequency of the microwave generators 20, which is for example 50 Hz.

Furthermore, the control and/or evaluation unit 30 can include a memory in which the results of several measurements can be stored. The memory can contain tables, in particular lookup-tables, regression models and/or machine learning models, as explained below.

Basically, an electromagnetic signal is first generated by the respective microwave generator 20, which uses to this end corresponding excitation parameters, i.e. the frequency, amplitude and/or phase, which are used for the generation of the respective electromagnetic signal.

The microwave generators 20 are designed as solid state microwave generators so that the corresponding excitation parameters can be set independently and individually for each microwave generator 20.

The electromagnetic signals generated by the microwave generators 20 are then modulated with the waveform by means of the modulation unit 24 so that correspondingly modulated signals are fed into the cooking chamber 14.

The waveform may be a symmetrical waveform, so that a symmetrically modulated signal is obtained.

The symmetrical waveform can have a sine, cosine, square, sawtooth, triangle and/or trapezoid form. In this respect, the symmetrical waveform may also be a combination of the previously mentioned forms.

Figure 2:
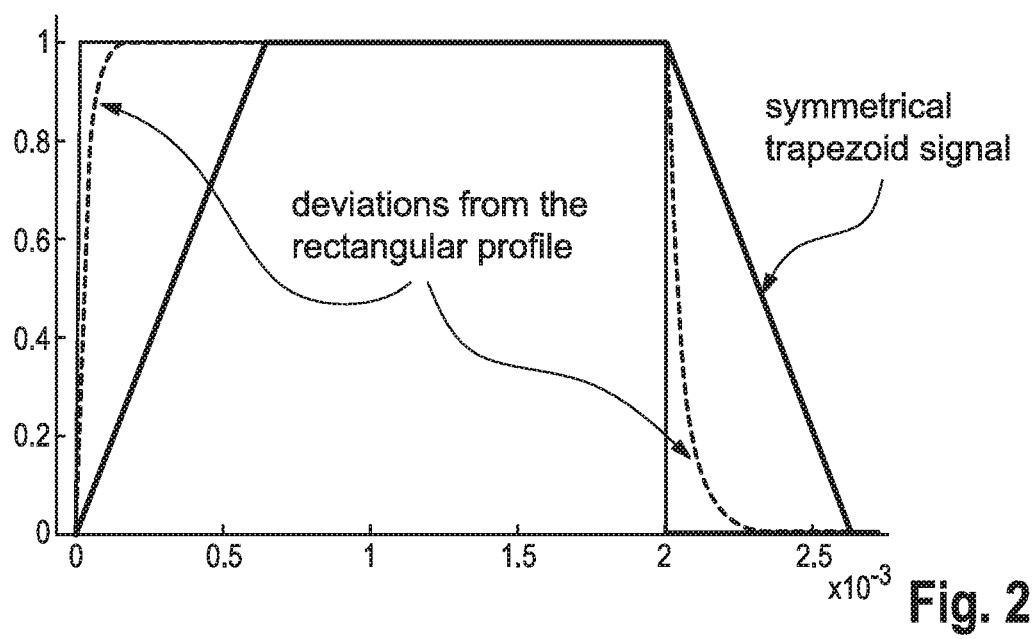
FIG. 2 shows an overview of a modulated signal used in the method according to the present disclosure.

FIG. 2 clearly shows that a signal modulated so as to be rectangular is difficult to obtain in reality, because thermal and/or capacitive effects of the hardware used will result in an unsymmetrical ramp profile, which will cause deviations from the (ideal) rectangular shape, as shown in FIG. 2.

In this respect it is advantageous to use a symmetric waveform which already has a ramp profile, in particular a symmetric one. In particular, the ramps should be flatter than the ramps created by the unavoidable effects if a rectangular shape would be used. A corresponding trapezoidal waveform is shown in FIG. 2 as an example.

In other words, the symmetrical waveform is generated such that the physical limitations of the hardware, which would lead to asymmetry are taken into account. It is thus ensured that the asymmetry of the backward electromagnetic waves is solely due to the corresponding absorption behavior in the cooking chamber 14.

The modulated signals fed into the cooking chamber 14 generate a fixed spatial electrical field distribution in the cooking chamber 14, which is unknown, as this depends, among other things, on the food to be cooked 18 and/or cooking accessories present in the cooking chamber 14, in particular the arrangement thereof in the cooking chamber 14.

Furthermore, the electrical field distribution that forms in the cooking chamber 14 can be influenced (additionally) by a mode mixer such as a fan impeller 32, which the cooking device 10 can include.

In this respect, the position of the mode mixer or the fan impeller 32 represents an additional control parameter for the electrical field distribution. This can be realized via an appropriate trigger signal.

The trigger signal may also be referred to as reference signal, as it specifies a trigger or reference for the mode mixer or fan impeller 32. More specifically, the trigger or reference signal is based on a fixed angle of the mode mixer or the fan impeller 32.

The trigger or reference signal thus ensures that measurements are performed in the same position of the mode mixer or the fan impeller 32. In other words, the corresponding measurement data can be assigned to an angle of the mode mixer or the fan impeller 32.

In principle, the excitation parameters of the microwave generator 20 and the position of the mode mixer or the fan impeller 32 may thus be regarded as control parameters, via which the electric field distribution is controlled.

Figure 3:
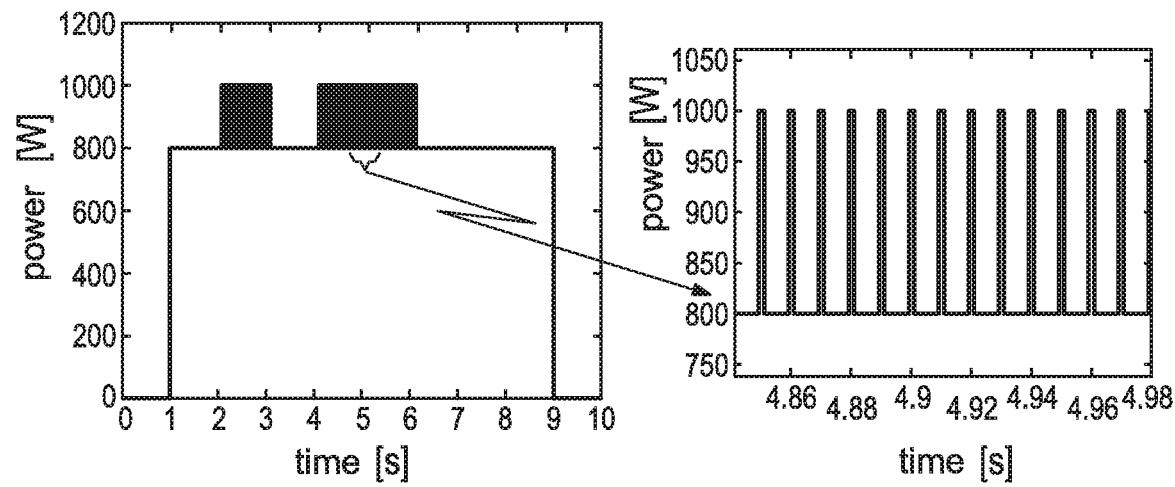
FIG. 3 shows an overview showing when the method according to the present disclosure can be used in a cooking process.

As clearly shown in FIG. 3, the modulated signals can be fed in during a heating phase. In the example shown, the modulated signals have a power of 200 W (sensor power), whereas the heating power is 800 W. However, the signals may also have a power in the mW range.

In addition, FIG. 3 shows that the modulated signals are fed into the cooking chamber 14 in pulses, for example with a duty cycle of 10%.

By adjusting the excitation parameters of the microwave generators 20 and the position of the fan impeller 32 or the mode mixer, i.e. the corresponding angle of rotation, it is possible to set the fixed spatial electric field distribution.

In any case, for a given combination of control parameters, i.e. the excitation parameters and/or the fan impeller position, an assigned fixed spatial electric field in the cooking chamber 14 will result. This fixed spatial electric field is assigned to a unique combination of the control parameters.

Several different combinations of the control parameters, i.e. several excitation parameters and/or several fan impeller positions, can be used to generate several fixed spatial electric field distributions in the cooking chamber 14. Thus, different frequencies, (relative) amplitudes and/or (relative) phases can be provided to generate the different electric field distributions.

Figure 4:
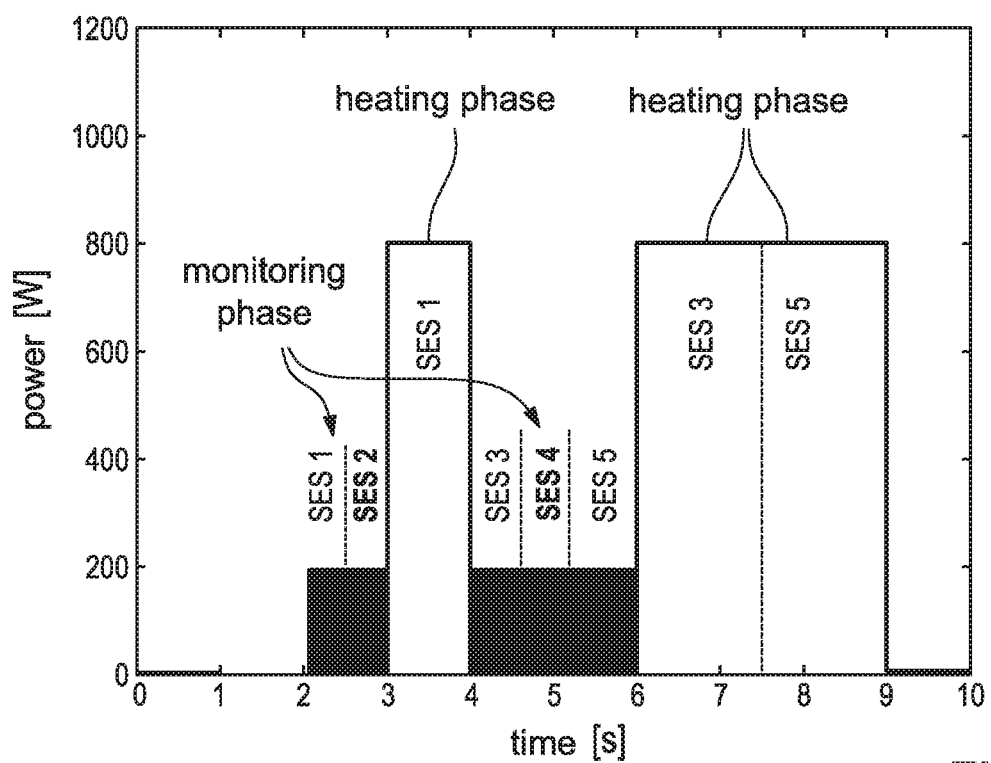
FIG. 4 shows a further overview showing when the method according to the present disclosure can be used in a cooking process.

This is already shown in FIG. 3, but also in FIG. 4, where the modulated signals are fed into the cooking chamber 14 when there is no heating phase (of the microwave generator 20), i.e. in the idle phase (of the microwave generator 20).

The corresponding phases in which the modulated signals are fed in can generally be referred to as monitoring or sensor phases.

The different fixed spatial electric field distributions are marked in FIG. 4 with SES and a corresponding number for differentiation.

It is already clear that several fixed spatial electric field distributions are used, wherein subsequently only specific electric field distributions are used for the heating phases. The control parameters leading to the fixed spatial electric field distributions SES 2 and SES 4 result in poor heating conditions, which is why these control parameters or the resulting fixed spatial electric field distributions are not used for corresponding heating phases, as shown in FIG. 4.

The selection of the fixed spatial electric field distributions used for the heating phases is done as described below.

For each fixed spatial electric field distribution in the cooking chamber 14, a modulation of the corresponding electromagnetic signal can be performed. The modulated signal is fed into the cooking chamber 14, i.e. it is emitted towards the object 18 to be analyzed. The at least one wave quantity of the forward electromagnetic wave and the at least one wave quantity of the backward electromagnetic wave are each measured at each of the antennas 22, for example the amplitudes and/or the phases, which thus represent corresponding wave quantities.

The wave quantities are then evaluated to determine the absorption behavior of the objects in the cooking chamber 14, in particular of the food to be cooked 18.

When evaluating the wave quantities, network parameters can be determined that are assigned to the respective antennas 22. These can be S, Y and/or Z matrices.

In particular, ratios of the determined network parameters are used, e.g. the ratio of the network parameters of the forward and backward wave(s), for example for each antenna 22.

Hardware induced asymmetries can thus be eliminated.

The evaluation of the wave quantities is based on the fact that in a fixed spatial electric field distribution in the cooking chamber 14, the corresponding waveform, in particular the symmetry thereof is disturbed, which can be detected at specific frequencies in the frequency domain, for example in the Fourier spectrum.

The electromagnetic signal generated by the microwave generator 20 is therefore modulated with the at least one specific frequency.

These specific frequencies may be asymmetric harmonic Fourier frequencies (AHFF), as they have a corresponding, easily detectable asymmetry, via which it is possible to draw conclusions about the absorption behavior in the cooking chamber 14.

Therefore, the wave quantities of the forward electromagnetic wave and the backward electromagnetic wave are measured or evaluated at at least one specific frequency, for example the asymmetric harmonic Fourier frequency, to determine the absorption behavior.

In principle, the measured wave quantities are each transformed to obtain a spectrum of the respective transformation.

The spectrum assigned to the forward electromagnetic wave is then compared with the spectrum assigned to the backward electromagnetic wave to determine any deviations of the spectra from each other on the basis of which the object to be analyzed is characterized, as described below.

Figure 5:
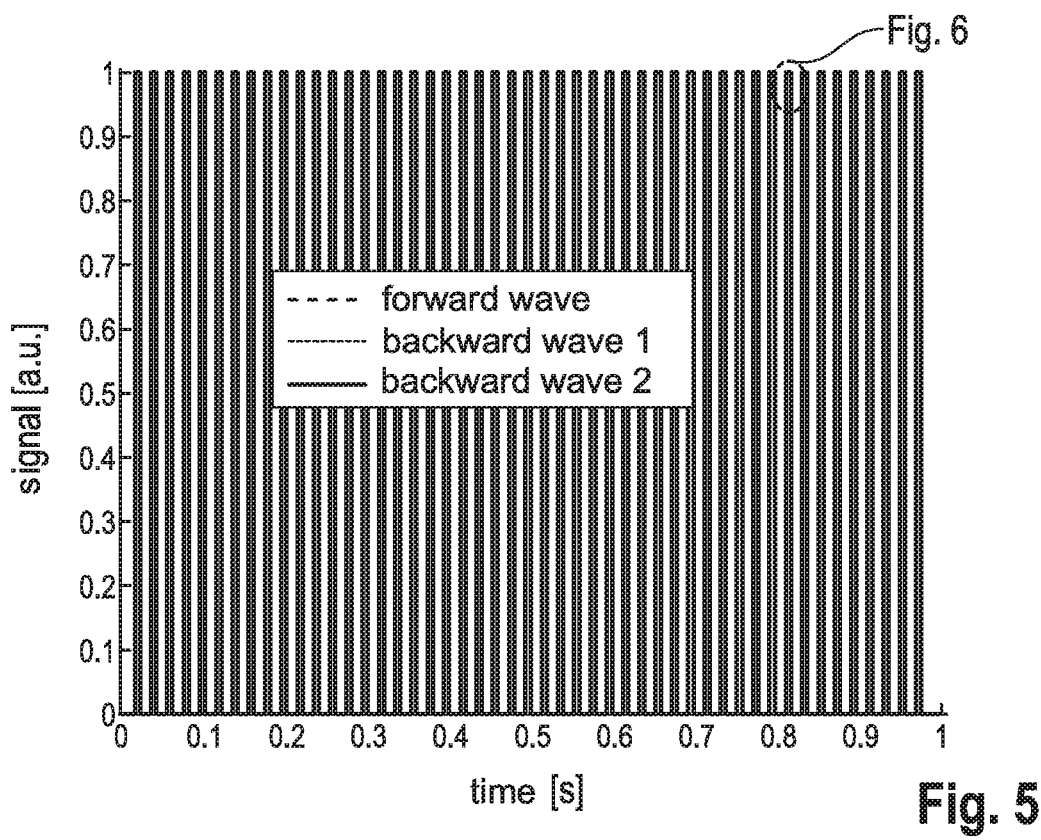
FIG. 5 shows several modulated signals used by the method according to the present disclosure to generate several spatial electric field distributions.
Figure 6:
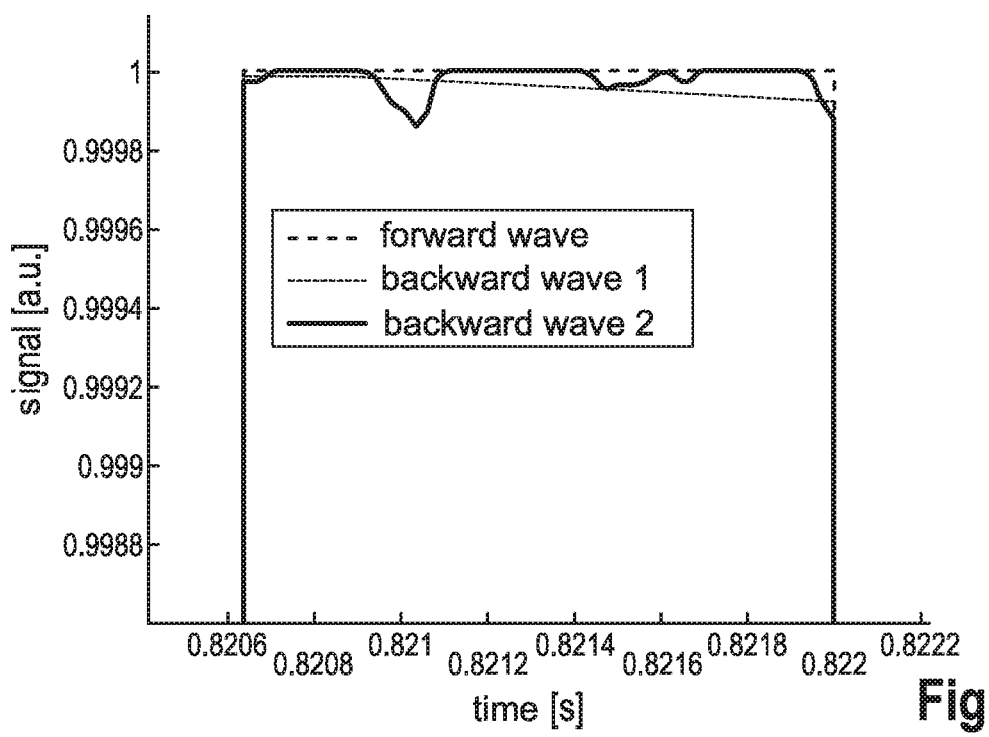
FIG. 6 shows a detailed view of a pulse from FIG. 5.

FIGS. 5 and 6 clearly show that the evaluation of the amplitude (wave quantity) of the respective waves would be insufficient or difficult. In the figures, the amplitude of the forward electromagnetic wave and the amplitudes of two backward electromagnetic waves having different absorption behavior are plotted against time.

The magnification of FIG. 6 clearly shows that the deviations are in the range of 0.001%, which is difficult to detect.

Figure 7:
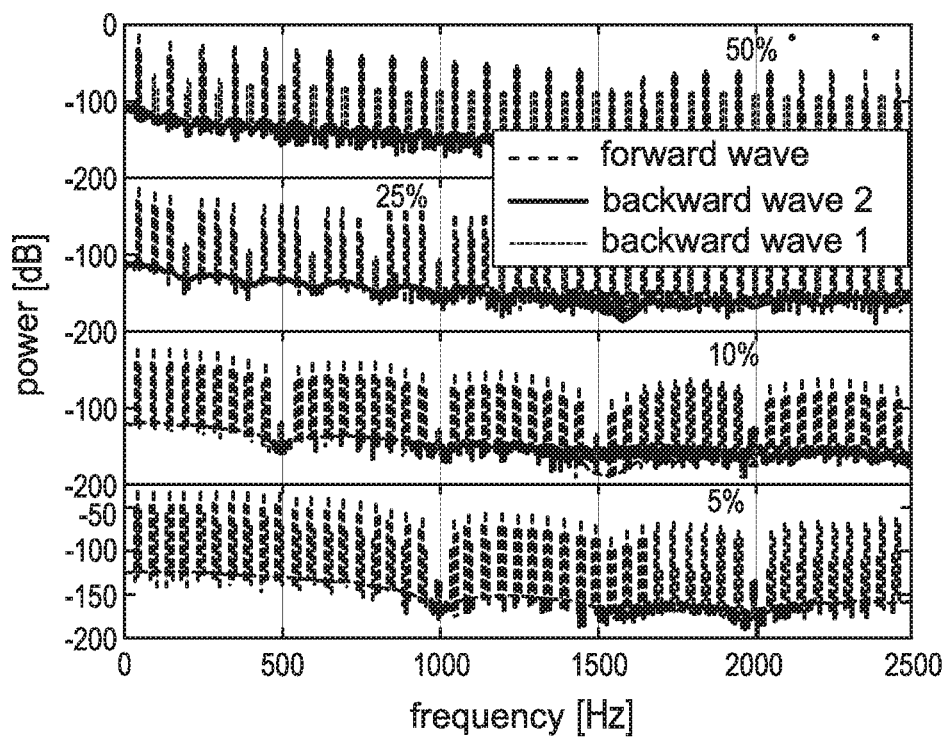
FIG. 7 shows a Fourier power spectrum at four different duty cycles for electromagnetic waves, which can be generated by the method according to the present disclosure.

Therefore, the specific frequencies, i.e. the asymmetric harmonic Fourier frequencies (AHFF), are taken into account, as shown in FIG. 7 for different duty cycles, namely 50%, 25%, 10% and 5%.

FIG. 7 shows Fourier power spectra for the forward electromagnetic wave and the two backward electromagnetic waves.

The asymmetric harmonic Fourier frequencies (AHFF) result from the respective duty cycle and the cycle frequency. Finally, the asymmetric harmonic Fourier frequencies correspond to a multiple of the quotient of the cycle frequency $f_{cycle}$ and the duty cycle D, which can be represented as follows:

$$f_{AHFF} = \frac{f_{cycle}}{D} * [1; 2; 3; 4; ...]$$

At a cycle frequency $f_{cycle}$ of 5 Hz and a duty cycle D of 10%, asymmetric harmonic Fourier frequencies $f_{AHFF}$ at [0.5; 1; 1.5; 2; ... ] kHz are produced, as shown in FIG. 7.

Figure 8:
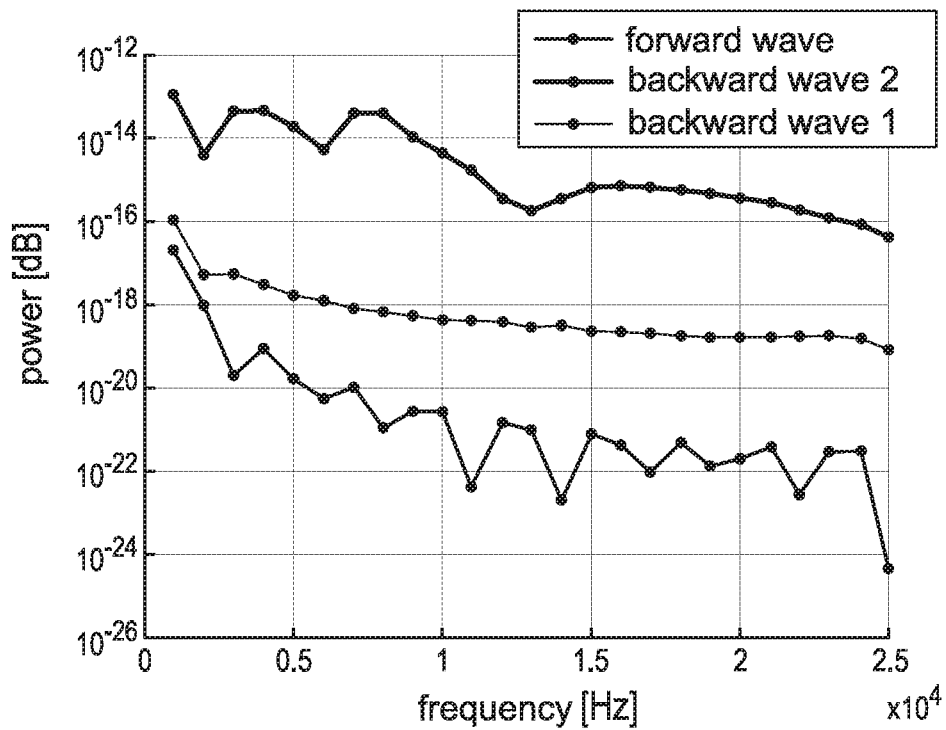
FIG. 8 shows wave quantities at specific frequencies which can be determined by the method according to the present disclosure.

In FIG. 8, the respective waves are plotted only at the asymmetric harmonic Fourier frequencies $f_{AHFF}$ for a duty cycle of 5%, so that corresponding curves of the wave quantity at the specific frequencies are produced.

This clearly shows that there are greater deviations between the forward electromagnetic waves and the backward electromagnetic waves, which can be easily identified accordingly.

As already explained, several differently modulated signals are basically generated, in particular also several different fixed spatial electric field distributions SES in the cooking chamber 14; see FIG. 4.

The wave quantities are measured and evaluated for each of these fixed spatial electric field distributions SES, in particular for each antenna 22 and/or for combinations of antennas 22, so that the specific frequencies, in particular the wave quantities at the specific frequencies, are observed for each fixed spatial electric field distribution, via which the absorption behavior of the food to be cooked 18 in the cooking chamber 14 can be determined. Among other things, it depends on the control parameters which of the antennas 22 is used for the measurement or analysis.

In this way, fixed spatial electrical field distributions can be identified where a defrosting, a uniform heating and/or a uniform drying takes place.

Accordingly, this can be determined experimentally by identifying areas where the corresponding fixed spatial electric field distribution results in a heating power in a specific area.

Thus, among other things, fixed spatial electric field distributions can be determined where there is a high microwave absorption, which in turn can lead to hotspots. Such field distributions should be avoided (if a uniform power distribution is desired) or should be chosen at least only with low radiant power, which is accordingly taken into account when controlling the microwave generators.

The control parameters assigned to the respective fixed spatial electric field distributions are at least (temporarily) stored so that the control and/or evaluation unit 30 can further determine which control parameters can lead to hotspots.

Each fixed spatial electric field distribution provides information about how a specific area in the cooking chamber 14 behaves with respect to microwave absorption. By evaluating several fixed spatial electric field distributions, it can therefore be ensured that essentially all areas of the cooking chamber 14 are scanned or observed with regard to the absorption behavior.

If a fixed spatial electric field distribution is detected, which results in a high absorption behavior, the information can be obtained that at least one area of the food to be cooked 18 tends to form hotspots, which should be avoided even if the specific area is unknown.

In principle, the cooking device 10, in particular the control and/or evaluation unit 30, can control the microwave generators 20 such that only fixed spatial electrical field distributions are formed, which result in essentially the same absorption behavior, so that hotspots are avoided.

Alternatively or additionally, it may be provided that the control and/or evaluation unit 30 reduces the power at fixed spatial electric field distributions which result in a high absorption behavior.

In principle, the method ensures that the food to be cooked 18 is heated up essentially evenly, since fixed spatial electrical field distributions are avoided, which result in a high absorption behavior.

The method described can in particular be connected upstream of a method for cooking the food to be cooked 18, in which, on the basis of the method described above by means of which control parameters have been determined, appropriate fixed spatial electrical field distributions are used, which result in a uniform heating of the food to be cooked 18 or in a focused heating, in particular for defrosting the food to be cooked 18. The method can also be carried out during a cooking method. This will be discussed later.

In addition to the control parameters which can be determined via the method, it is also possible to identify which kind of food to be cooked 18, i.e. which type of food to be cooked, is in the cooking chamber 14.

In principle, it is possible to determine an object type of the object 18, a position of the object 18, the volume of the object 18, the amount of the object 18, the temperature of the object 18, the aspect ratio of the object 18, the number of the objects 18 and/or the state of the object 18.

For this purpose, several spectra can be evaluated, in particular statistically, to extract characteristics or evaluation quantities, for example from corresponding distributions. These characteristics or evaluation quantities can be used with the tables, the regression models and/or the machine learning models that are stored in the memory of the control and/or evaluation unit 30 to obtain the above-mentioned information regarding the object 18.

The form of the wave quantity (quantities) at the specific frequencies can also be used for this purpose, i.e. the form of the curve(s) shown in FIG. 8.

The form can then be used to infer the type of food to be cooked, i.e. the object type, provided that sufficient experimental data is available that can be used for a corresponding comparison or static evaluation to determine the type of the food to be cooked 18.

Furthermore, by continuously sensing the corresponding wave quantities, it can be determined how the state of the food to be cooked changes over time, as the absorption behavior of the food to be cooked 18 changes with the state of the food to be cooked.

This can also be done via the form of the wave quantity (quantities) at the specific frequencies, in particular in a similar way to the detection of the type of the food to be cooked.

For example, forecasts regarding the cooking method to be carried out, including the end of the cooking method, are thus established.

In general, the shape of the wave quantity (quantities) at the specific frequencies is important for the method, as relative changes are used instead of absolute values.

The method described above is thus carried out during a cooking method which uses hot air and electromagnetic radiation, for example. At the beginning, there is a uniform heating of the food to be cooked.

During the cooking method, modulated signals with a sensor power, which are fed into the cooking chamber 14, are generated at different fixed spatial electrical field distributions.

Several spectra of the specific frequencies are thus determined.

This procedure is performed for different loads in the cooking chamber 14 to distinguish between parameters of interest and nuisance parameters.

Characteristics or evaluation quantities which are invariant to the nuisance parameters can be extracted from the several spectra.

For this purpose, different measurements are carried out with different control parameters for several loads, in particular for each of the different loading scenarios or configurations. Some characteristics or evaluation quantities of the measurements or the measurement results (via the different control parameters) can be invariant with respect to some of the loading scenarios.

Thus, characteristics can be determined which are invariant to the nuisance parameters.

This means that the nuisance parameters have an influence on the fixed spatial electric field distribution, but change the fixed spatial electric field distribution only in such a way that some of the characteristics or evaluation quantities from the measurements or the measurement results (via the different control parameters) are invariant with respect to certain loads or loading scenarios.

For example, several spectra are sensed at specific frequencies, in particular asymmetric harmonic Fourier frequencies, and with different control parameters for a fixed load or loading scenario.

A statistical moment of a distribution, e.g. mean value, a variance or similar, or an average slope of several spectra can be used as a characteristic. The distribution can be a distribution of the specific frequencies, in particular the asymmetric harmonic Fourier frequencies.

A corresponding characteristic can be sensitive to the amount of load, but insensitive to the position of the object or vice versa.

Figure 9:
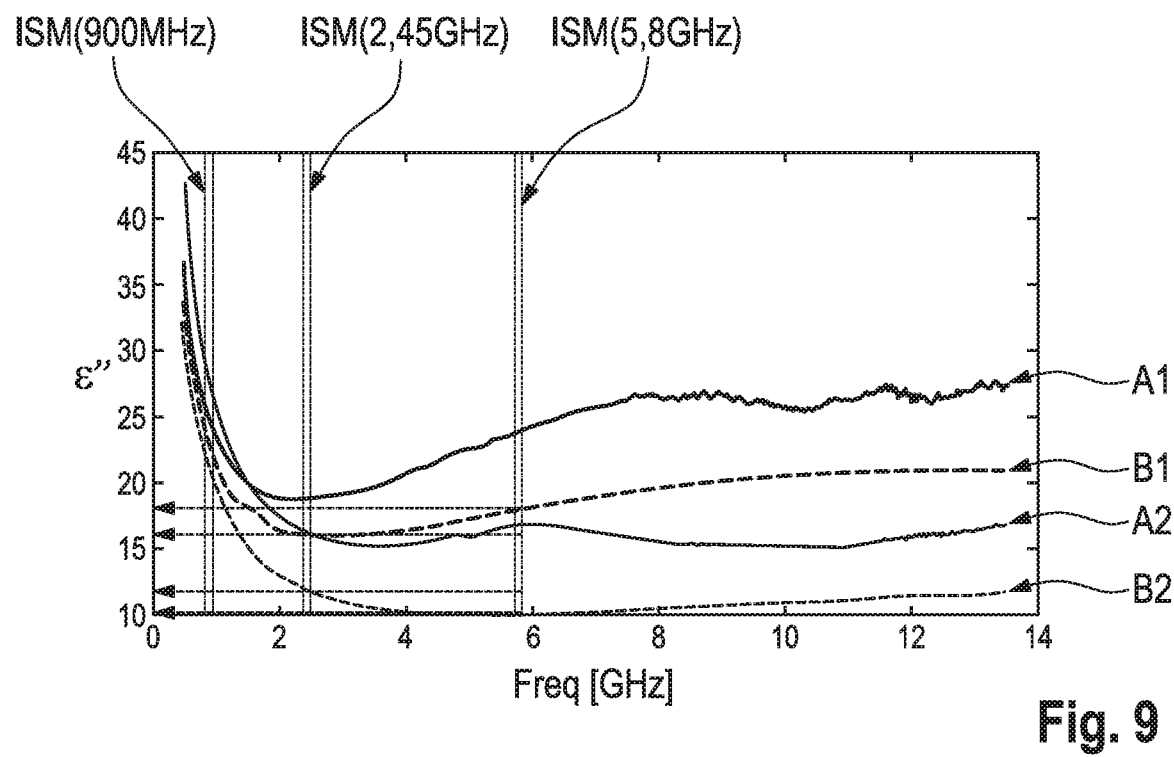
FIG. 9 shows a diagram showing the imaginary part of the permittivity of two different materials at two different temperatures.

FIG. 9 shows a diagram showing the imaginary part of the permittivity, i.e. the absorption property, of two different materials A, B at two different temperatures, namely at 25° C. and at 80° C. The corresponding curves are marked A1, A2 and B1, B2.

If the material is known, the temperature can be determined by modulating the electromagnetic signal. If the temperature is known, the material can be determined by modulating the electromagnetic signal.

The diagram clearly shows that the absorption behavior of different materials accordingly behaves differently at different temperatures, so that this can be determined unambiguously.

It is also apparent that the absorption behavior of a modulation in different frequency bands differs more clearly.

For example, the scattering within the 900 MHz ISM band is large. The dispersion within the 2.45 GHz and 5.8 GHz ISM bands is generally lower. Modulation by changing frequencies within an ISM band or between ISM bands generally results in different amplitudes of the backward electromagnetic waves, these differences being correspondingly greater or smaller, as clearly shown in FIG. 9.

In principle, as clearly shown in FIG. 9, different amplitudes of the backward electromagnetic waves are produced when the electromagnetic signal is modulated.

Figure 10:
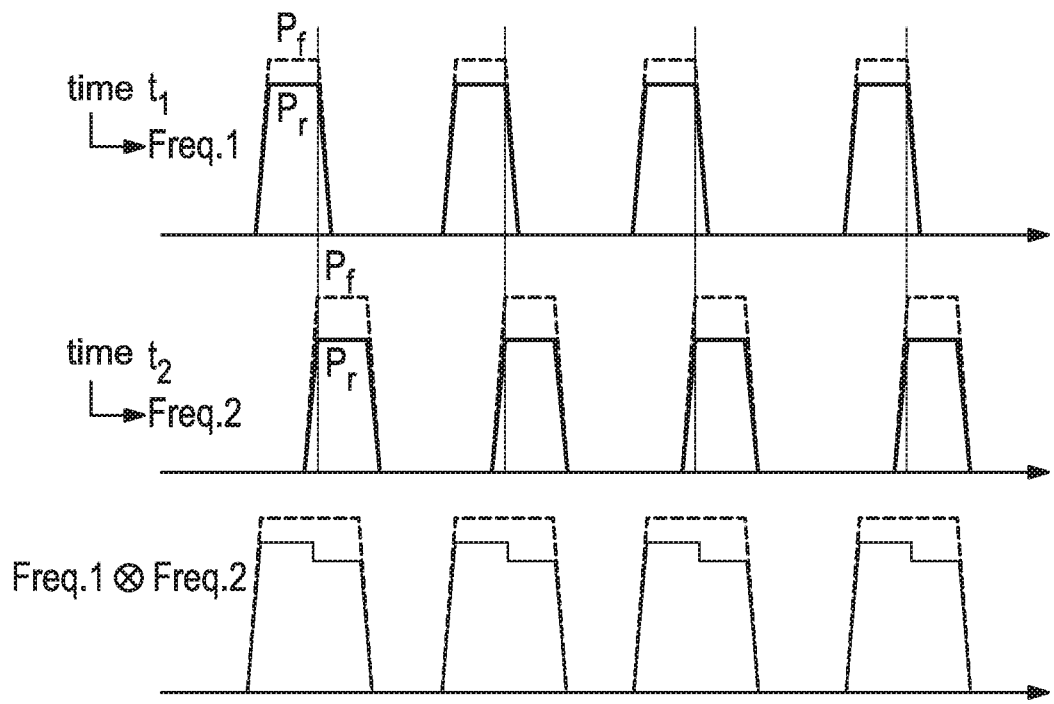
FIG. 10 shows an overview showing two symmetrically modulated signals, which were transmitted at different times, and a post-processing of the two symmetrically modulated signals.

FIG. 10 shows that the method also allows two symmetrically modulated signals to be emitted accordingly at two different frequencies at different times. The frequencies can be in one ISM band or in different ISM bands.

During the evaluation, the respective signals, which were emitted at different times, are shifted to each other and then combined in a post-processing step. During the transformation and the comparison, asymmetries at the different frequencies are determined accordingly, as can be seen from the lower diagram in FIG. 10.

This allows conclusions to be drawn about the material of the object 18, if the temperature is known, and/or conclusions about the temperature of the object 18, if the material is known.

Figure 11:
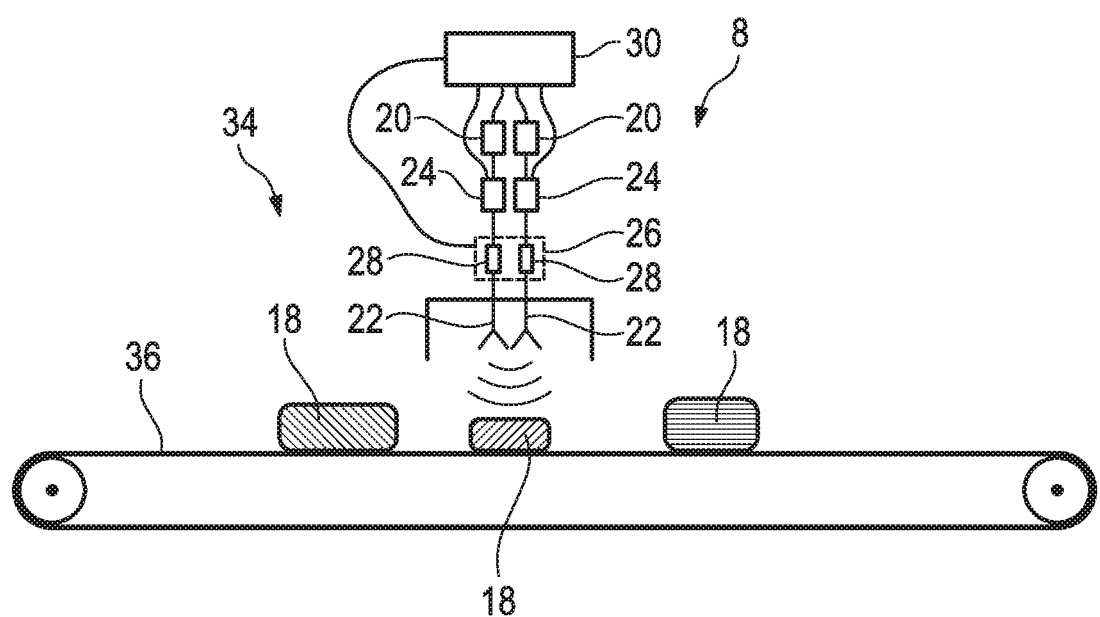
FIG. 11 shows an analyzing device according to the present disclosure which is arranged to perform the method according to the present disclosure.

FIG. 11 shows an analyzing device 8, which is used in a transport system 34 to analyze the objects 18 passing on a conveyor belt 36, in particular with regard to the absorption behavior thereof.

It becomes apparent that a closed chamber, such as a cooking chamber, is not necessarily required. It is only important that the same area is covered at different frequencies.

Since the temperature is known, the material of the objects 18 can easily be determined, as the backward electromagnetic waves depend mainly on the corresponding material.

For this purpose the analyzing device 8 includes at least one microwave generator 20 and an antenna 22, which is assigned to the microwave generator 20.

The analyzing device 8 also includes a modulation unit 24, a measuring unit 26 having directional couplers 28 and a control and/or evaluation unit 30.

Using the analyzing device 8, which is assigned to the transport system 34, the objects 18 can be characterized using the method described above.

In principle, the cooking device 10 can be used to carry out a method of operating the cooking device 10 in which first a method of analyzing the absorption behavior of the object 18, i.e. the food to be cooked in the cooking chamber 14 is performed as described above. In this respect, the absorption behavior of the at least one object 18 located in the cooking chamber 14 is first determined.

Then the power of the electromagnetic radiation generated by the at least one microwave generator 20 is focused into at least one specific area of the cooking chamber 14 or distributed evenly in the cooking chamber 14 based on the determined absorption behavior.

In principle, for a fixed loading configuration, several measurements can be performed at different control parameters, i.e. at different fixed spatial electric field distributions.

The different control parameters result in different fixed spatial electrical field distributions, since the loading configuration or loading scenario is respectively always the same.

Based on the measurement data obtained during the measurements, the spectra of all measurements can be grouped based on characteristics or evaluation quantities of each spectrum, for example, due to the shape of the spectrum and/or due to the range of quantities, spectra having similar amplitudes at the at least one specific frequency, i.e., the asymmetric harmonic Fourier frequency, having a similar heating power with respect to uniformity, i.e., the distribution of power.

A characteristic (evaluation quantity) or several characteristics (evaluation quantities) can also be obtained from the shape of the distribution(s) of the transformations, i.e. the transformed spectra, which result in a uniform heating power.

To determine control parameters that result in a uniform heating power by means of electromagnetic radiation, a series of experiments can first be carried out when cooking food to be cooked, in which the cooking is carried out exclusively by means of evenly distributed hot air. During the experiments, a low microwave power can be present simultaneously for different control parameters. However, the microwave power is so low that it has no influence on the cooking behavior or the food to be cooked 18. Therefore, this can be referred to as sensor power.

From the determined spectra, characteristics or evaluation quantities can be extracted, for example the form of the spectrum and/or amplitude. The form of a distribution of the spectra can also be used to determine a statistical moment of the distribution, e.g. mean value, variance or similar, or a mean slope of several spectra.

In principle, characteristics or evaluation quantities can be determined which are invariant to nuisance parameters, for example invariant to the quantity and/or position of the food to be cooked 18, but have the type of food to be cooked as a parameter of interest. These characteristics or evaluation quantities could then be used to determine control parameters for the particular type of food to be cooked independently of the quantity and/or position of food to be cooked 18, i.e. independently of the nuisance parameters.

For a particular type of food to be cooked, several measurements are carried out for this purpose with different nuisance parameters and different control parameters.

The aim is to determine characteristics or evaluation quantities that not only result in a uniform heat power, but are also invariant to the nuisance parameters.

This information can be used when cooking with electromagnetic radiation with a heating power of the electromagnetic radiation generated by the microwave generator 20 evenly distributed in the cooking chamber 14, i.e. a high microwave power is intended.

For this purpose, measurements are carried out again at a low power of the electromagnetic radiation, for example the sensor power, with different control parameters.

The different control parameters used now do not have to be the same as in the previous experiments where cooking was done with hot air only.

Then, the characteristics or evaluation quantities of the individual spectra and/or distribution(s) are analyzed, those spectra being selected, the characteristics of which largely correspond to those determined in the experiment with hot air only.

The assigned control parameters are then used for uniform cooking by means of electromagnetic radiation, i.e. for the uniformly distributed microwave power.

This procedure can be applied in an analogous way to focus the electromagnetic radiation into a specific area of the cooking chamber 14.

For this purpose, the respective area or the other areas are provided with a specific material during the experiments. The specific material may be a material which is thermally insulating but transparent to electromagnetic radiation in the form of microwaves.

The method is then carried out as described above to determine the corresponding control parameters.

The invention claimed is:

1. A method of analyzing the absorption behavior of an object, comprising the following steps:
   generating at least one electromagnetic signal emitted via at least one antenna such that a fixed spatial electric field distribution is produced,
   modulating the electromagnetic signal with a waveform at the fixed spatial electric field distribution to generate a modulated signal which is emitted via the at least one antenna as a forward electromagnetic wave towards the object to be analyzed,
   measuring at least one wave quantity of the forward electromagnetic wave,
   receiving a backward electromagnetic wave via at least one antenna,
   measuring at least one wave quantity of the backward electromagnetic wave, and
   evaluating the measured wave quantity of the backward electromagnetic wave and the measured wave quantity of the forward electromagnetic wave by respectively transforming the measured wave quantities to obtain a spectrum of the respective transformation, wherein the spectrum assigned to the forward electromagnetic wave is compared with the spectrum assigned to the backward electromagnetic wave to determine deviations of the spectra from each other on the basis of which the object is characterized.

2. The method according to claim 1, characterized in that at least one network parameter assigned to the at least one antenna is determined via the measured wave quantities.

3. The method according to claim 1, characterized in that the transformation of the corresponding wave quantity comprises phase information and/or amplitude information.

4. The method according to claim 1, characterized in that the measured wave quantity of the backward electromagnetic wave and the measured wave quantity of the forward electromagnetic wave at at least one specific frequency are measured and/or evaluated.

5. The method according to claim 4, characterized in that the at least one specific frequency is an asymmetric harmonic Fourier frequency.

6. The method according to claim 1, characterized in that a plurality of different modulated signals are generated which are used at several different fixed spatial electric field distributions, wherein the wave quantity of the forward electromagnetic wave and the wave quantity of the backward electromagnetic wave are measured and evaluated for each fixed spatial electric field distribution.

7. The method according to claim 1, characterized in that at least one evaluation quantity, which is used as input parameter for a mathematical model, a machine learning algorithm or a regression model is determined during the evaluation.

8. The method according to claim 1, characterized in that based on the evaluation, the radiant power is adapted for at least one fixed spatial electric field distribution.

9. The method according to claim 1, characterized in that an object type of the object, a position of the object, the volume of the object, the amount of the object, the temperature of the object, the aspect ratio of the object, the number of objects and/or the state of the object is determined during the evaluation.

10. A method of operating a cooking device, in which first a method according to claim 1 is carried out so that the absorption behavior of the at least one object located in the cooking chamber is determined, the power of the electromagnetic radiation being then focused into at least one specific area of the cooking chamber or distributed uniformly in the cooking chamber based on the determined absorption behavior.

11. An analyzing device for analyzing the absorption behavior of an object, having at least one microwave generator which is arranged to generate an electromagnetic signal, at least one antenna which is assigned to the microwave generator, a modulation unit which is arranged to modulate the electromagnetic signal generated by the microwave generator with a waveform to generate a modulated signal, and a measuring unit assigned to the at least one antenna, wherein the measuring unit is arranged to measure at least one wave quantity of a forward wave of the signal and at least one wave quantity of a backward wave, and wherein the cooking device comprises a control or evaluation unit which is arranged to evaluate the measured wave quantity of the backward electromagnetic wave and the measured wave quantity of the forward electromagnetic wave by respectively performing a transformation of the measured wave quantities in each case, to obtain a spectrum of the respective transformation, wherein the control or evaluation unit is arranged to compare the spectrum assigned to the forward electromagnetic wave with the spectrum assigned to the backward electromagnetic wave to determine deviations of the spectra from each another on the basis of which the object is characterized.

* * * * *